3,459,735
PROCESS FOR THE PREPARATION OF VITAMIN B₁₂ COENZYME AND DERIVATIVES THEREOF
Masuo Murakami, Kozo Takahashi, and Jun Matsumoto, Tokyo, Japan, assignors to Yamanouchi Pharmaceutical Co., Ltd., Tokyo, Japan
No Drawing. Filed Sept. 13, 1967, Ser. No. 667,348
Claims priority, application Japan, Sept. 20, 1966, 41/62,179
Int. Cl. C07d 55/62
U.S. Cl. 260—211.7    6 Claims

ABSTRACT OF THE DISCLOSURE

By reacting a thiol complex of hydroxocobalamin and sodium sulfide with a 5'-deoxy-5'-halogenoadenosine, vitamin $B_{12}$ coenzyme is obtained with a high yield.

---

The present invention relates to a process for the preparation of vitamin $B_{12}$ coenzyme and derivatives thereof.

It has been considered that when cobalamins such as cyanocobalamin, hydroxocobalamin, and nitrosocobalamin are administered, in unit dosage form, to the human body, they exhibit their activities after being converted into vitamin $B_{12}$ coenzyme in the liver. On the other hand, when vitamin $B_{12}$ coenzyme is administered to a human body, the coenzyme acts directly because the conversion thereof into vitamin $B_{12}$ coenzyme in the human body is unnecessary. Therefore, it is very profitable to administer vitamin $B_{12}$ coenzyme in the therapy of a patient whose liver function has been lowered. Furthermore, since vitamin $B_{12}$ coenzyme has an excellent retention in the body as compared with the above-mentioned cobalamins, there is the advantage that, when it is administered to the body, the interval between administrations thereof can be prolonged as compared with the relatively short intervals necessary for the cobalamins.

The vitamin $B_{12}$ coenzyme is a cyanocobalamin wherein a 5'-deoxyadenosyl group (alkyl group) has been bonded to the central Co atom, instead of the cyano group. By the derivatives of vitamin $B_{12}$ coenzyme in this invention are meant vitamin $B_{12}$ coenzyme of which the 2'-position and/or the 3'-position of the 5'-deoxyadenosyl group is substituted with an acetyl group or an isopropylidene group as well as the compound wherein the amino group of the 5'-deoxyadenosyl group may be further substituted with an acetyl group or a formyl group.

In the preparation of vitamin $B_{12}$ coenzyme or a derivative thereof by introducing a 5'-deoxyadenosyl group or a derivative thereof onto the central Co atom of the cobalamin molecule, it is known to reduce a cobalamin such as cyanocobalamin or hydroxocobalamin with Zn+acetic acid, NaBH₄, chromous acetate, or $$Zn+NH_4Cl$$

to form the complete reduction product thereof, i.e., vitamin $B_{12s}$ (the compound has the characteristic absorption near the wave length of 385 mμ (Nature; 176, 1265 (1955), and Chemical Review; 63, 591 (1963)) and then to react the resultant compound with an alkylating agent such as 5'-tosyladenosine (Bernhauer et al., Biochem. Zeit. 336, 102 (1962); Johnson et al., J. Chem. Soc. 4146 (1963); and U.S. Patent No. 3,213,082). However, such a process is not suitable as an industrial process since not only the reduction of the vitamin $B_{12}$ but also the reaction of the complete reduction product thereof with the alkylating agent must be conducted in a completely oxygen-free atmosphere.

On the other hand, as a process for preparing a lower alkyl cobalamin wherein a lower alkyl group is introduced onto the central Co atom of the cobalamin molecule, there is known a process wherein hydroxocobalamin is caused to react with a mercaptan, sodium sulfide or sodium hydrogen sulfide to form a thiol complex and then the complex is caused to react with a lower alkylating agent such as CH₃I, or C₂H₅I (Dolphin, Johnson et al., J. Chem. Soc., 2174 (1965) and Dolphin et al., Proc. Chem. Soc., 311 (1963)). However, at the same time, it has been known that by such process vitamin $B_{12}$ coenzyme or a derivative thereof cannot be obtained, that is, since if the alkyl group of the alkylating agent, such as 2',3'-O-isopropylidene-5'-tosyladenosine, used in the known process, is large the reaction of the thiol complex and the alkylating agent becomes difficult and hence the objective material (for example 2',3'-O-isopropylidene - 5' - deoxyadenosylcobalamin) is not obtained (J. Chem. Soc., 2178 (1965), lines 1–3).

Thus, there have been known the above two methods, but as mentioned above, in the former method the reaction system must be completely shielded from oxygen and in the latter method, although it is unnecessary to carry out the reaction in an oxygen-free atmosphere, a 5'-deoxyadenosyl group or a derivative thereof cannot be introduced onto the central Co atom of the cobalamin. Therefore, it has been a desideratum to produce vitamin $B_{12}$ coenzyme by introducing a 5'-deoxyadenosyl group or a derivative thereof into cobalamin without the necessity of the troublesome procedure of shielding the reaction system from oxygen.

Therefore, an object of this invention is to provide an improved process for preparing vitamin $B_{12}$ coenzyme and derivatives thereof without entailing the above-mentioned troubles.

Another object of this invention is to enable the introduction of the 5'-deoxyadenosyl group or a derivative thereof onto the central Co atom of a cobalamin to be carried out in a normal atmosphere.

These objects of this invention can be achieved by the process of the present invention.

Thus, according to this invention, when 5'-deoxy-5'-halogenoadenosine or a derivative thereof, instead of 2',3'-O-isopropylidene-5'-tosyladenosine, is caused to react with the thiol complex of an alkali metal salt of hydrogen sulfide such as sodium sulfide with a cobalamin, in the aforesaid process, vitamin $B_{12}$ coenzyme or a derivative thereof can be obtained with a good yield.

It has been unexpected that 5'-deoxy-5'-halogenoadenosine or a derivative thereof reacts with the thiol complex, the molecular structure of the 5'-deoxy-5'-halogenoadenosine or the derivative thereof being almost the same as that of 2',3'-O-isopropylidene-5'-tosyladenosine.

In the present invention, the reaction of the thiol complex and the alkylating agent and the subsequent treatments must be conducted under light-shielding as in the above-mentioned known process. However, it is unnecessary to conduct them under completely oxygen-free conditions as in the process described in U.S. Patent No. 3,213,082.

As a cobalamin for forming the thiol complex in the process of this invention, besides hydroxocobalamin there may be used cyanocobalamin, nitrosocobalamin and the like.

As the alkali metal salt of hydrogen sulfide, there may be used sodium sulfide, sodium hydrogen sulfide, potassium sulfide, potassium hydrogen sulfide, and the like.

As the alkylating agent, 5'-deoxy-5'-halogeno-adenosine or a derivative thereof, there are illustrated 5'-deoxy-5'-iodo(or bromo)-adenosine, 2',3'-O-isopropylidene-5' - deoxy - 5' - iodo(or bromo) - adenosine, 2',3'-diacetyl-5'-deoxy-5'-iodo(or bromo)-adenosine, N-acetyl-2',3' - O - isopropylidene - 5' - deoxy - 5' - iodo(or bromo)-adenosine, and the like. However, 5'-tosyladenosine or a derivative thereof that has heretofore frequently been used cannot be used in the process of this invention.

As a solvent in the reaction of this invention, there may be employed usually water, a lower alcohol such as methanol or ethanol, a solvent miscible with water such as acetone or dioxane, or a mixed solvent thereof with water.

In the preferred embodiment of the process of this invention, hydroxocobalamin is caused to react with an alkali metal salt of hydrogen sulfide in the aforesaid solvent to provide a thiol complex and the thiol complex thus obtained has the alkylating agent added thereto, under light-shielding. In addition, in the case of forming a thiol complex by using hydrogen sulfide, the hydrogen sulfide may be introduced into a solution of hydroxocobalamin after the addition of a solution of a basic material, for example, an alkali metal hydroxide such as sodium hydroxide or potassium hydroxide or ammonia. Furthermore, in the process of this invention, the separation of the product from the reaction liquid, under light-shielding, may be conducted by an extraction method with an organic solvent such as phenol, or by a chromatographic method.

The derivative of vitamin $B_{12}$ coenzyme obtained by the process of this invention has no activity of vitamin $B_{12}$ coenzyme but by liberating the substituent at the 2'-position and/or the 3'-position of the 5'-deoxyadenosyl group thereof and, in some cases, the substituent of the amino group if present, the derivative can be easily converted into vitamin $B_{12}$ coenzyme.

In this case, the substituent, such as an isopropylidene group at the 2'-position and 3'-position of the 5'-deoxyadenosyl group or the substituent, such as an acetyl group at the amino group of the 5'-deoxyadenosyl group, can be liberated by a mineral acid, such as sulfuric acid or hydrochloric acid and also the substituent, such as an acetyl group, at the 2'-position and/or 3'-position of the 5'-deoxyadenosyl group can be liberated by alcoholic ammonia or an alkali metal alkoxide.

The thiol complex prepared from hydroxocobalamin and hydrogen sulfide or an alkali metal salt thereof is a vitamin $B_{12r}$ having bonded thereto a sulfur atom (the vitamin $B_{12r}$ has the characteristic absorption near the wave length of 473 m$\mu$ as shown in Nature; 176, 1265 (1955) and Chem. Rev.; 63, 591 (1963)), said vitamin $B_{12r}$ being one of the reduced cobalamins each having Co atom, which is generally believed to be in a divalent state, described in U.S. Patent No. 3,213,082, 2nd column, lines 53–62. Further, the thiol complex is assumed to have the following structure, which is completely different from that of vitamin $B_{12s}$;

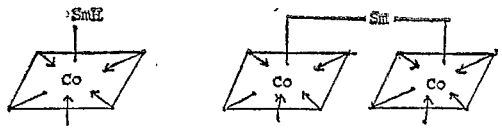

wherein $m$ represents an integer of from 1 to 6.

The invention has been explained above only with reference to hydroxocobalamin, but it should be understood that other cobalamins such as cyanocobalamin or nitrosocobalamin can also be employed.

The invention will further be explained by the following examples.

EXAMPLE 1

When 100 mg. of hydroxocobalamin was dissolved in 1 ml. of methanol and the solution was mixed with a solution of 50 ml. of potassium hydrogen sulfide in 0.5 ml of water, the color of the reaction liquid was immediately changed from dark red to purple-brown. (The following procedures were all conducted in the dark.) The reaction liquid had added thereto a solution of 80 mg. of N-acetyl-2',3'-O-isopropylidene-5'-deoxy-5'-iodoadenosine in 1 ml. of methanol and the resulting solution was allowed to stand for one hour. The reaction liquid was subjected to concentration under reduced pressure to distill off methanol, the concentrate thus obtained was mixed with 30 ml. of water, and the resulting solution was subjected to extraction by using a mixed solution of phenol and chloroform (1:1). The extract was washed with water twice and subjected to concentration under reduced pressure. The residue was, after the addition of ether in an amount of about five times as large as that of the residue, extracted with water. The aqueous extract was washed with ether twice and subjected to concentration under reduced pressure. The residue was then passed through a column (1 cm. x 10 cm.) packed with an adsorbent diethylaminoethyl cellulose to adsorb thereto effective components and thereafter they were eluted with water. The eluate was concentrated under reduced pressure, the concentrated residue thus obtained was passed through a column (1 cm. x 10 cm.) containing carboxymethyl cellulose and then eluated with water. The eluate was concentrated under reduced pressure and the concentrated residue was allowed to stand for a while with the addition of acetone to provide 63 mg. of the dark-red crystals of N - acetyl - 2',3' - O - isopropylidene - 5' - deoxyadenosyl vitamin $B_{12}$. The ultraviolet and visible absorption spectra of the product has the absorption maxima at 263, 342 and 525 m$\mu$, respectively.

EXAMPLE 2

When 250 ml. of hydroxocobalamin was dissolved in 3 ml. of methanol and the solution had added thereto a solution of 200 mg. of sodium sulfide (9H$_2$O) in 1 ml. of water, the color of the reaction liquid changed immediately from dark red into purple-brown. (The following procedures were all conducted in the dark.) In 2 ml. of ethanol, there was dissolved 230 mg. of 5'-deoxy-5'-iodoadenosine and, after immediately cooling, the solution was thereupon added to the above solution, and the system was allowed to stand for one hour. By treating the reaction liquid as in Example 1, 220 mg. of 5'-deoxyadenosyl vitamin $B_{12}$ (vitamin $B_{12}$ coenzyme) was obtained. The ultraviolet and visible absorption spectra of the product has the absorption maxima at 263, 342 and 525 m$\mu$, respectively.

EXAMPLE 3

By repeating the same procedure as in Example 2 while using 100 mg. of hydroxocobalamin, 80 mg. of sodium sulfide (9H$_2$O), and 80 mg. of 5'-deoxy-5'-bromoadenosine, 45 mg. of 5'-deoxyadenosyl vitamin $B_{12}$ was obtained.

EXAMPLE 4

In 5 ml. of deoxygenated water, there were dissolved 100 mg. of cyanocobalamin and 100 mg. of sodium sulfide (9H$_2$O) and then after the addition of a solution of 100 mg. of 5'-deoxy-5'-iodoadenosine in 2 ml. of methanol, the system was allowed to stand for 3 hours in the dark to cause reaction. Thereafter, the extraction treatment as in Example 1 was conducted, and the aqueous extract thus obtained was concentrated under reduced pressure. The concentrated residue was passed through a column containing diethylaminoethyl cellulose and then eluted with water. The extract was concentrated under reduced pressure and the residue thus obtained was passed through a column containing carboxymethyl cellulose and thereafter eluted with water. The portion containing unreacted cyanocobalamin eluted at the beginning was removed and then the elution was continued. The portion of 5'-deoxyadenosyl vitamin $B_{12}$ eluted was collected and concentrated under reduced pressure. The concentrated residue was allowed to stand with the addition of methanol to form crystals, which were recovered by filtration and washed with acetone and ether to provide 28 mg. of red crystals of 5'-deoxyadenosyl vitamin $B_{12}$.

EXAMPLE 5

In 2 ml. of 50% methanol which had been deoxygenated by introducing a sufficient amount of nitrogen gas, there was dissolved 70 mg. of sodium sulfide ($9H_2O$). Further, 100 mg. of hydroxocobalamin was dissolved in the above solution in a nitrogen atmosphere. The purple-brown solution thus obtained had added thereto a solution of 80 mg. of 5'-deoxy-5'-bromoadenosine in 3 ml. of 50% methanol which had also been deoxygenated and the resulting solution was allowed to stand for one hour in the dark. Thereafter, the system was treated as in Example 1 to provide 45 mg. of 5'-deoxyadenosyl vitamin $B_{12}$.

EXAMPLE 6

In 20 ml. of water, there was dissolved 500 mg. of hydroxocobalamin, the solution thus obtained had added thereto 500 mg. of sodium sulfide ($9H_2O$), and the purple-brown solution thus obtained was allowed to stand for 30 minutes. The reaction liquid was extracted by using 1-to-1 phenol-chloroform mixed solution, the extract was washed with water twice and then chloroform was removed from the solution by distillation. Ether was added to the residue in an amount about five times as large as that of the residue and then extracted with water. The aqueous layer was washed with ether twice and then concentrated under reduced pressure. The concentrate was passed through a column (1.5 cm. x 25 cm.) containing carboxymethyl cellulose and then eluted with water. The eluate was concentrated again under reduced pressure until the volume thereof became about 2 ml. The residue had added thereto acetone to form precipitates, which were recovered by filtration and washed with acetone and ether successively to provide 170 mg. of dark brown powders.

Elementary analysis Co: 3.37%, S: 3.61%

The analytical value shows that the ratio of Co to S is 1 to 2.

After dissolving 100 mg. of the sulfur-containing vitamin $B_{12}$ complex (thiol complex) salt thus obtained in 2 ml. of methanol, adding thereto 80 mg. of sodium sulfide ($9H_2O$), and then adding 4 ml. of a 50% methanol solution containing 80 mg. of 5'-deoxy-5'-iodoadenosine, the resulting solution was allowed to stand for one hour in the dark.

By treating, thereafter, the system as in Example 1, 55 mg. of red crystals of 5'-deoxyadenosyl vitamin $B_{12}$ were obtained.

In the foregoing, the abbreviations "mg." and "ml." stand for "milligrams" and "milliliters," respectively.

What is claimed is:

1. A process for the preparation of a vitamin $B_{12}$ coenzyme and derivatives thereof which comprises reacting a thiol complex of a cobalamin and an alkali metal salt of hydrogen sulfide with a member selected from the group consisting of 5'-deoxy-5'-iodoadenosine, 5'-deoxy-5'-bromoadenosine, 2',3'-O-isopropylidene-5'-deoxy-5'-iodoadenosine, 2',3'-O-isopropylidene-5'-deoxy-5'-bromoadenosine, 2',3'-diacetyl-5'-deoxy-5'-iodoadenosine, 2',3'-diacetyl-5'-deoxy-5'-bromoadenosine, N-acetyl-2',3'-O-isopropylidene-5'-deoxy-5'-iodoadenosine and N-acetyl-2',3'-O-isopropylidene-5'-deoxy-5'-bromoadenosine.

2. The process as claimed in claim 1 wherein said cobalamin is selected from the group consisting of hydroxocobalamin, cyanocobalamin and nitrosocobalamin.

3. The process as claimed in claim 1 wherein said thiol complex is prepared by the reaction of a cobalamin with an alkali metal salt of hydrogen sulfide.

4. The process as claimed in claim 3 wherein said alkali metal salt of hydrogen sulfide is selected from the group consisting of sodium sulfide, sodium hydrogen sulfide, potassium sulfide and potassium hydrogen sulfide.

5. The process as claimed in claim 1 wherein said thiol complex is prepared by introducing hydrogen sulfide gas into a system containing a cobalamin and a basic material.

6. The process as claimed in claim 5 wherein said basic material is selected from the group consisting of sodium hydroxide, potassium hydroxide and ammonia.

References Cited

UNITED STATES PATENTS 3,213,082   10/1965   Smith et al.

OTHER REFERENCES

Dolphin et al. Jour. Chem. Soc., 1965, pp. 2174–78.

LEWIS GOTTS, Primary Examiner

J. R. BROWN, Assistant Examiner

U.S. Cl. X.R.

260—999